United States Patent
Kuroda et al.

(10) Patent No.: US 9,674,798 B2
(45) Date of Patent: *Jun. 6, 2017

(54) TRANSPORT FORMAT COMBINATION SELECTING METHOD, WIRELESS COMMUNICATION SYSTEM, AND MOBILE STATION

(71) Applicant: NEC CORPORATION, Tokyo (JP)

(72) Inventors: Nahoko Kuroda, Tokyo (JP); Kojirou Hamabe, Tokyo (JP); Jinsock Lee, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/164,212

(22) Filed: May 25, 2016

(65) Prior Publication Data

US 2016/0270009 A1 Sep. 15, 2016

Related U.S. Application Data

(63) Continuation of application No. 14/075,055, filed on Nov. 8, 2013, now Pat. No. 9,363,816, which is a (Continued)

(30) Foreign Application Priority Data

Jun. 11, 2004 (JP) .................................. 2004-173418

(51) Int. Cl.
*H04L 1/00* (2006.01)
*H04W 72/08* (2009.01)
(Continued)

(52) U.S. Cl.
CPC ......... *H04W 52/367* (2013.01); *H04L 1/0015* (2013.01); *H04W 24/10* (2013.01);
(Continued)

(58) Field of Classification Search
CPC . H04W 52/34; H04W 52/267; H04W 72/082; H04W 52/367; H04W 52/146;
(Continued)

(56) References Cited

U.S. PATENT DOCUMENTS 6,747,958 B2 6/2004 Vayanos et al.
6,813,284 B2 11/2004 Vayanos et al.
(Continued)

FOREIGN PATENT DOCUMENTS

EP 1 296 494 A2 3/2003
JP 2003-304195 10/2003
(Continued)

OTHER PUBLICATIONS

Extended European Search Report dated Jul. 11, 2014 received in European counterpart application EP14163321.4-1860.
(Continued)

*Primary Examiner* — Sujatha Sharma
(74) *Attorney, Agent, or Firm* — Scully, Scott, Murphy & Presser, P.C.

(57) ABSTRACT

Methods of selecting a transport format combination are provided. For example, a method comprises calculating the transmission power of a first physical channel using each of first TFCs, and determines whether a mobile station is in a transmission capable state. The method also comprises calculating the sum of the transmission power of first and second physical channels using first and second TFCs, with respect to each of combinations of first and second TFCs, and determines whether the mobile station is in the transmission capable state. The method also comprises selecting first TFC from the first TFCs wherein the mobile station is in the transmission capable state and selecting a second TFC from the second TFCs which are included in combinations wherein the mobile station is in the transmission capable (Continued)

state among the combinations including the selected first TFC. The data is transmitted using the selected first and second TFCs, respectively.

21 Claims, 15 Drawing Sheets

Related U.S. Application Data continuation of application No. 13/610,430, filed on Sep. 11, 2012, now Pat. No. 8,583,163, which is a continuation of application No. 13/183,108, filed on Jul. 14, 2011, now Pat. No. 8,306,566, which is a continuation of application No. 12/687,989, filed on Jan. 15, 2010, now Pat. No. 8,019,375, which is a continuation of application No. 11/587,460, filed as application No. PCT/JP2005/008418 on May 9, 2005, now Pat. No. 7,761,111.

(51) Int. Cl.
    *H04W 52/34*     (2009.01)
    *H04W 52/36*     (2009.01)
    *H04W 52/26*     (2009.01)
    *H04W 24/10*     (2009.01)
    *H04W 52/16*     (2009.01)
    *H04W 52/50*     (2009.01)

(52) U.S. Cl.
CPC ......... *H04W 52/16* (2013.01); *H04W 52/267* (2013.01); *H04W 52/34* (2013.01); *H04W 52/50* (2013.01); *H04W 72/082* (2013.01); *H04L 1/0002* (2013.01)

(58) Field of Classification Search
CPC . H04W 52/228; H04W 52/04; H04W 52/265; H04W 72/1242; H04W 28/18; H04W 52/26; H04W 52/36; H04W 72/087; H04W 24/08; H04W 24/00; H04W 24/02; H04W 52/18; H04W 24/04; H04W 52/10; H04W 52/143; H04W 52/38; H04W 24/06; H04W 36/165; H04W 52/60; H04W 88/06; H04W 88/10; H04L 1/0002; H04B 17/0067; H04B 17/003; H04B 7/0632; H01Q 1/03
See application file for complete search history.

(56) References Cited

U.S. PATENT DOCUMENTS

| | | |
|---|---|---|
| 2003/0036403 A1 | 2/2003 | Shiu et al. |
| 2003/0078010 A1 | 4/2003 | Davis |
| 2004/0185892 A1 | 9/2004 | Iacono et al. |
| 2009/0086709 A1 | 4/2009 | Pani et al. |
| 2009/0154403 A1 | 6/2009 | Niwano |

FOREIGN PATENT DOCUMENTS

| | | |
|---|---|---|
| JP | 2004-514320 | 5/2004 |
| JP | 2005-064872 | 3/2005 |
| WO | 02/39623 A1 | 5/2002 |
| WO | 03/015322 A1 | 2/2003 |
| WO | 03/043221 A1 | 5/2003 |

OTHER PUBLICATIONS

Group Radio Access Network, "3rd Generation Partnership Project: Technical Specification Group Radio Access Network; Feasibility Study for Enhanced Uplink for UTRA FDD" R 25.896 V6.0.0 (Mar. 2004).
NEC: "TFC Selection for E-DCH", TSG-RAN Working Group 2, Jun. 24, 2004.
U.S. Official Action issued Dec. 1, 2010 in corresponding U.S. Appl. No. 12/687,989.
"TFC Selection for HSUPA", Panasonic, 3GPP TSG-RAN WG2 Meeting #42, May 2004, R2-040972, pp. 5-7.
Chinese Official Action dated Mar. 12, 2012 from related application CN 201010135674.4 together with an English language translation.
U.S. Official Action issued Nov. 8, 2011 in corresponding U.S. Appl. No. 13/183,108.
U.S. Official Action issued Apr. 2, 2012 in corresponding U.S. Appl. No. 13/183,108.
U.S. Official Action issued Mar. 22, 2013 in corresponding U.S. Appl. No. 13/610,430.
U.S. Notice of Allowance issued Jul. 8, 2013 in corresponding U.S. Appl. No. 13/610,430.
U.S. Official Action issued Jan. 16, 2015 in corresponding U.S. Appl. No. 14/075,055.
U.S. Official Action issued Jun. 15, 2015 in corresponding U.S Appl. No. 14/075,055.
U.S. Official Action issued Jul. 21, 2014 in corresponding U.S. Appl. No. 14/075,055.
U.S. Notice of Allowance issued Feb. 8, 2016 in corresponding U.S. Appl. No. 14/075,055.

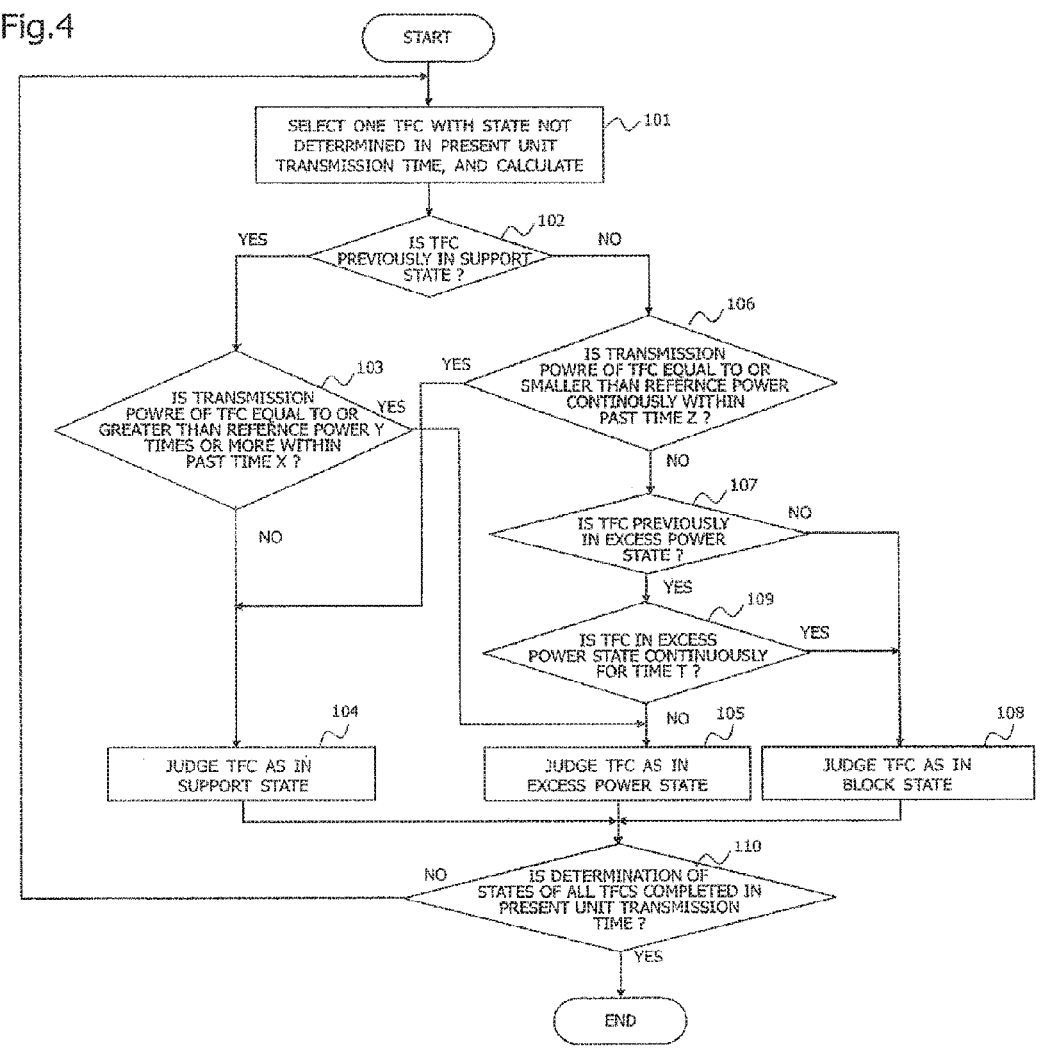

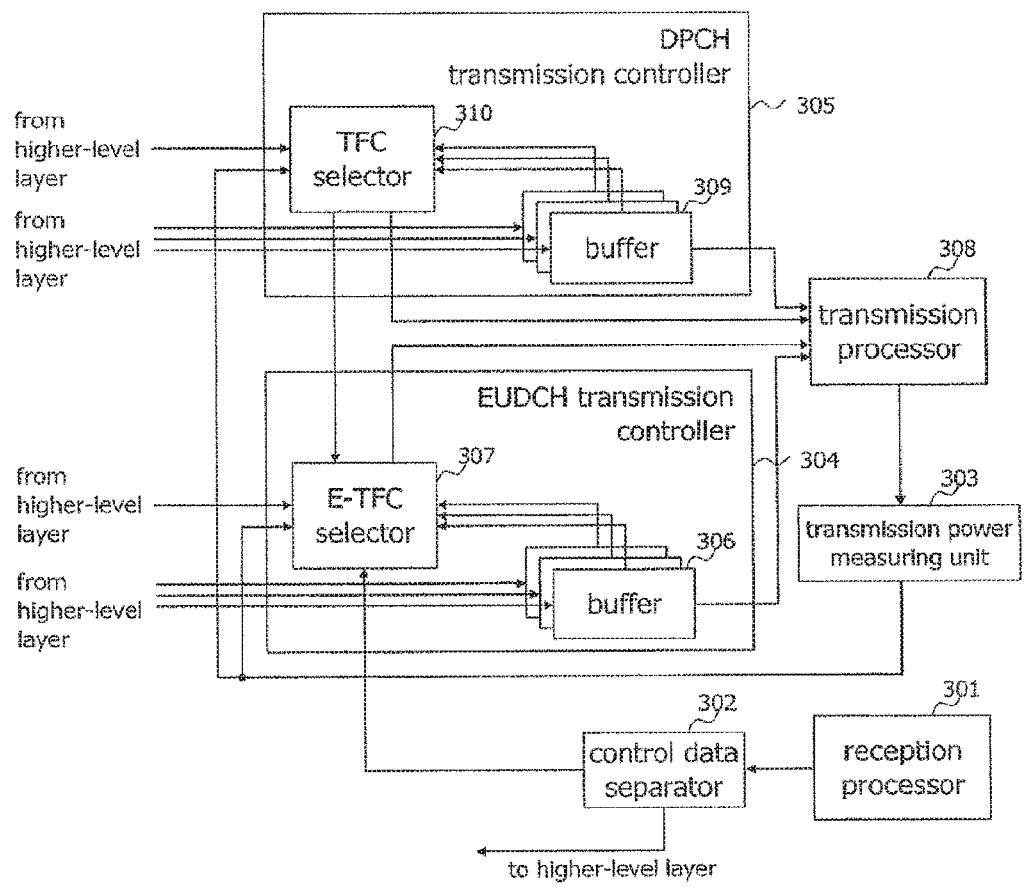

Fig.6A

| TFC3 | ΔTFC3 |
|---|---|
| TFC2 | ΔTFC2 |
| TFC1 | ΔTFC1 |
| TFC0 | ΔTFC0 |

Fig.6B

| DPCH / EDUCH | TFC0 | TFC1 | TFC2 | TFC3 |
|---|---|---|---|---|
| E-TFC4 | ΔTFC0 + ΔE-TFC4 | ΔTFC1 + ΔE-TFC4 | ΔTFC2 + ΔE-TFC4 | ΔTFC3 + ΔE-TFC4 |
| E-TFC3 | ΔTFC0 + ΔE-TFC3 | ΔTFC1 + ΔE-TFC3 | ΔTFC2 + ΔE-TFC3 | ΔTFC3 + ΔE-TFC3 |
| E-TFC2 | ΔTFC0 + ΔE-TFC2 | ΔTFC1 + ΔE-TFC2 | ΔTFC2 + ΔE-TFC2 | ΔTFC3 + ΔE-TFC2 |
| E-TFC1 | ΔTFC0 + ΔE-TFC1 | ΔTFC1 + ΔE-TFC1 | ΔTFC2 + ΔE-TFC1 | ΔTFC3 + ΔE-TFC1 |
| E-TFC0 | ΔTFC0 + ΔE-TFC0 | ΔTFC1 + ΔE-TFC0 | ΔTFC2 + ΔE-TFC0 | ΔTFC3 + ΔE-TFC0 |

Fig.7A

| TFC3 | E |
|---|---|
| TFC2 | S |
| TFC1 | S |
| TFC0 | S |

Fig.7B

| DPCH / EDUCH | TFC0 | TFC1 | TFC2 | TFC3 |
|---|---|---|---|---|
| E-TFC4 | B | B | B | B |
| E-TFC3 | E | B | B | B |
| E-TFC2 | S | E | B | B |
| E-TFC1 | S | S | E | B |
| E-TFC0 | S | S | S | E |

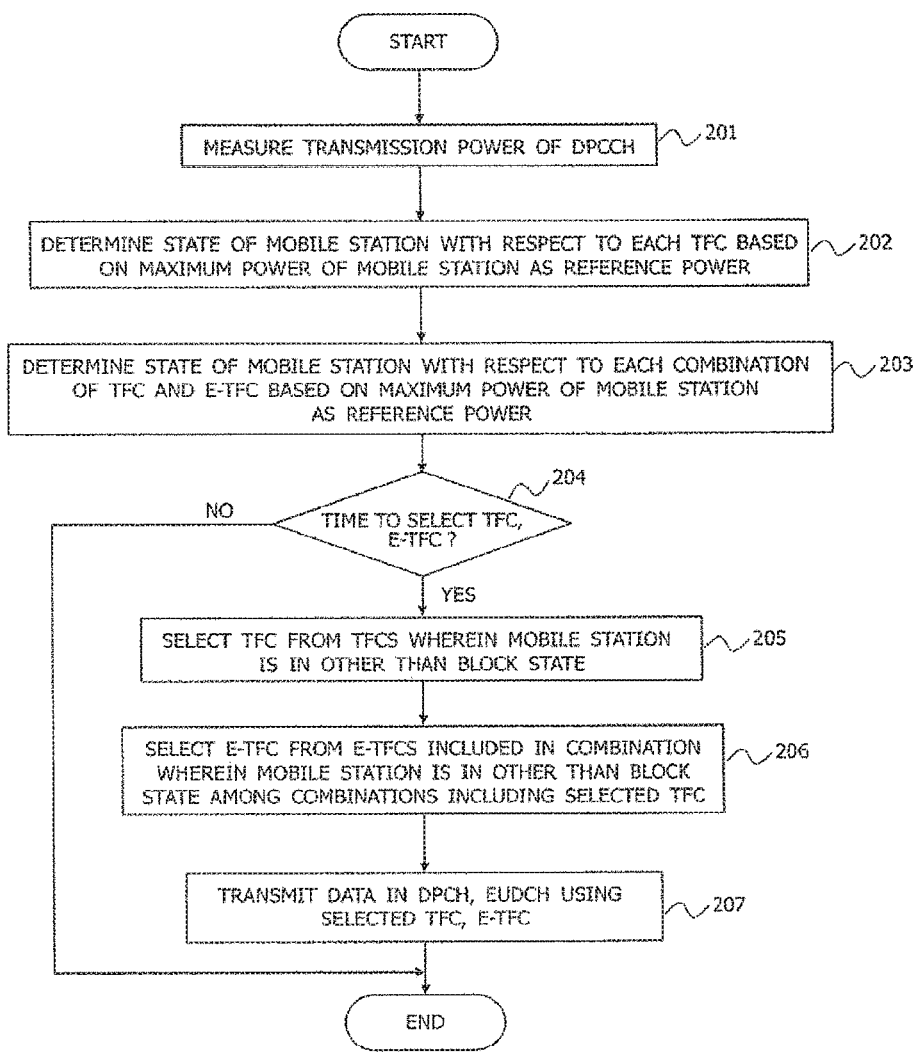

Fig.11

| DPCH / EDUCH | TFC0 | TFC1 | TFC2 | TFC3 |
|---|---|---|---|---|
| E-TFC4 | B | B | B | B |
| E-TFC3 | E | B | B | B |
| E-TFC2 | S | E | B | B |
| E-TFC1 | S | S | E | B |
| E-TFC0 | S | S | S | E |

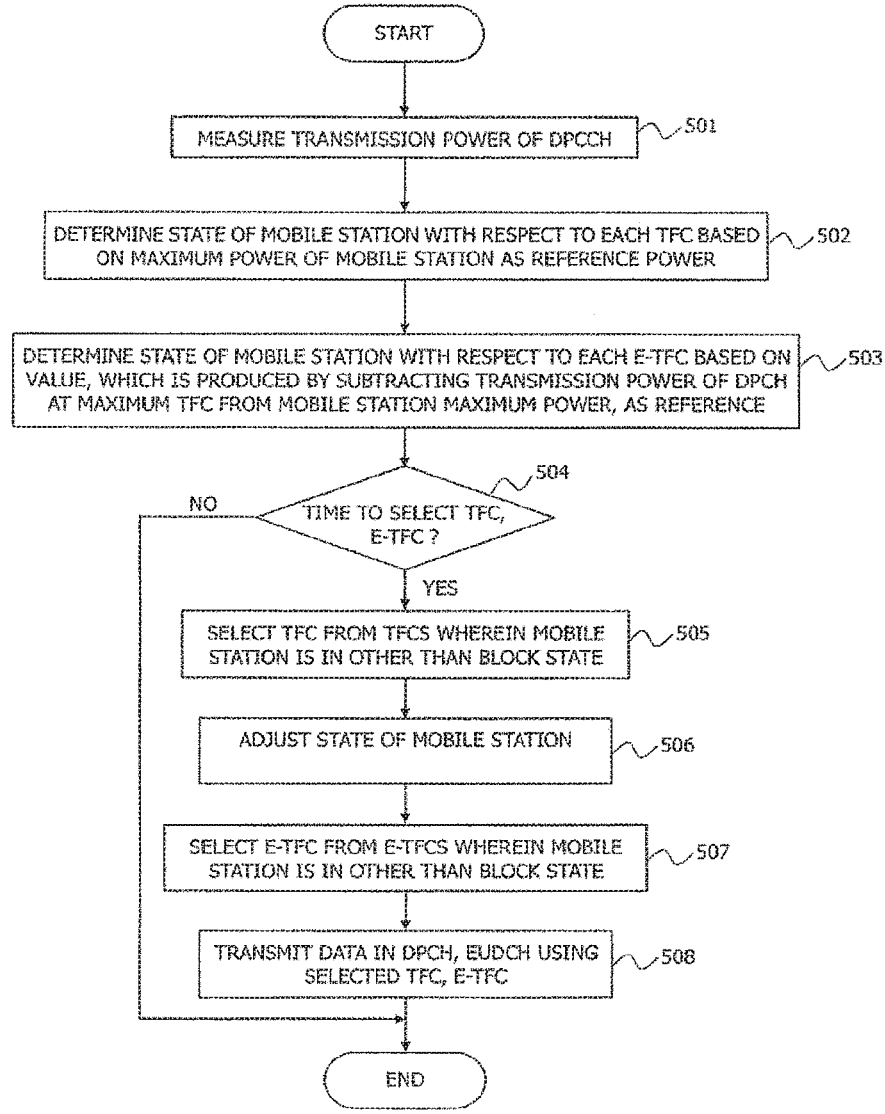

TRANSPORT FORMAT COMBINATION SELECTING METHOD, WIRELESS COMMUNICATION SYSTEM, AND MOBILE STATION

CROSS REFERENCE OF RELATED APPLICATION

The present application is a continuation application of U.S. Ser. No. 14/075,055 filed Nov. 8, 2013 which is a continuation application of U.S. Ser. No. 13/610,430 filed Sep. 11, 2012 (now U.S. Pat. No. 8,583,163), which is a continuation application of U.S. Ser. No. 13/183,108 filed Jul. 14, 2011 (now U.S. Pat. No. 8,306,566), which is a continuation application of U.S. Ser. No. 12/687,989 filed Jan. 15, 2010 (now U.S. Pat. No. 8,019,375), which is a continuation application of U.S. Ser. No. 11/587,460 filed on Oct. 25, 2006 (now U.S. Pat. No. 7,761,111), which is a submission under 35 U.S.C. 371 of International Application No. PCT/JP2005/008418 dated May 9, 2005, and claiming priority of Japanese patent application 2004-173418 filed on Jun. 11, 2004, the entire contents of each of which are incorporated herein by reference.

TECHNICAL FIELD

The present invention relates to a technology for selecting a transport formation combination which represents a combination of transport formats to be set in transport channels of uplink physical channels, for each of such uplink physical channels in a mobile station of a wireless communication system.

BACKGROUND ART

WCDMA (Wideband Code Division Multiple Access) wireless communication systems employ a direct code spreading multiplex process. According to the direct code spreading multiplex process, the transmission side spreads transmission data with a spreading code, and the reception side despreads reception data with the same spreading code. The reception data thus processed have a higher ratio of desired wave power to interference and noise power (SNIR: Signal to Noise Interference Ratio).

On the reception side, if the SNIR based on the despreading process is equal to or higher than a predetermined value, i.e., if the reception data have a predetermined quality or higher, then desired reception data can be decoded properly. Consequently, even when a plurality of links use the same frequency band, the above data spreading and despreading process makes it possible for the reception side to decode the reception data of the respective links.

Generally, as the spreading ratio on the transmission side is lower, the number of information bits that can be transmitted within the same time is greater and the transmission ratio is higher. On the other hand, because the increase in the SNIR based on the despreading process is reduced, it is necessary to increase the transmission power in order to satisfy the predetermined quality.

According to the direct code spreading multiplex process, the transmission power of a certain link serves as the interference power of another link. Therefore, it is important to set a transmission rate which can minimize the transmission power while satisfying transmission rate requirements, in each link for reducing interference to other links, and such a transmission rate leads to a reduction in the bandwidth of the wireless communication system.

Consequently, the WCDMA wireless communication system controls the transmission power of mobile and base stations to achieve transmission data of predetermined quality under high-speed closed-loop transmission power control.

According to 3GPP (3rd Generation Partnership Project), it has been studied to give a function to select a Transport Format Combination (hereinafter referred to as "TFC") to a WCDMA mobile station (see 3GPP TS 25.321 V5.8.0 (2004-March) "Medium Access Control (MAC) protocol specification").

The WCDMA mobile station is capable of transmitting the data of a plurality of different transport channels through a single physical channel. The mobile station generally uses a DPCH (Dedicated Physical Channel) as a physical channel. The DPCH includes a DPCCH (Dedicated Physical Control Channel) for sending pilot data and control data and a DPDCH (Dedicated Physical Data Channel) for sending user data. A transmission type called a Transport Format (hereinafter referred to as "TF") is set in each transport channel. Setting items of the TF include a transport block size, a CRC (Cyclic Redundancy Check) bit size, a coding process, a Transmission Time Interval (TTI), etc. The TFC referred to above represents a combination of TFCs set in difference transport channels.

According to the WCDMA wireless communication system, a base station control device indicates a TFC set including one or more TFCs to be permitted for the physical channel of each mobile station, and a mobile station selects a TFC to be used for sending a DPCH from the TFC set indicated by the base station control device.

A process of determining a state of a mobile station when it uses a TFC will be described below with reference to FIG. 1.

First, the transmission power of a DPCH when a TFC is used is calculated with respect to each TFC.

Then, the states of the mobile station when the respective TFCs are used are all classified as a support state.

If, among the TFCs belonging to the support state, there is a TFC wherein the transmission power of the DPCH is greater than the maximum transmission power of the mobile station for a time Y or longer in a predetermined time X in the past, then the state of the mobile station which uses that TFC is regarded as an excess power state.

If, among the TFCs belonging to the excess power state, there is a TFC which belongs to the excess power state for a predetermined time T or longer, then the state of the mobile station which uses that TFC is regarded as a block state.

If, among the TFCs belonging to the excess power state or the block state, there is a TFC which wherein the transmission power of the DPCH is equal to or smaller than the maximum transmission power of the mobile station continuously for a predetermined time Z, then the state of the mobile station which uses that TFC is returned to the support state.

The mobile station determines the state of the mobile station when it uses the TFCs, according to the above process. The mobile station selects a TFC for setting a TF with a high transmission rate in a transport channel with high priority, from the TFCs in other than the block state. Since the state of the mobile station when it uses the TFCs is determined based on long-term propagation path variations, a TFC which satisfies quality requirements on the average over a long time can be selected even if the propagation path varies instantaneously due to fading or the like.

At present, it is studied according the 3GPP to use an EUDCH (Enhanced Uplink Data Channel) as a physical channel for transmitting packets at a high speed through an uplink. With the EUDCH, it is studied that the base station and the base station control device will control the packet transmission format (primarily the transmission rate) for the uplink of a mobile station, using the TFC selecting function of the mobile station (see 3GPP TR 25.896 V6.0.0 (2004-March) "Feasibility Study for Enhanced Uplink for UTRAFDD").

The study shows that in the WCDMA wireless communication system, a base station measures the proportion (noise rise) of noise power in a desired wave of data received from a mobile station, and a base station control device controls the number of mobile stations connected to the base station and TFC sets in the mobile stations so that the above value measured by the base station will not exceed a predetermined threshold value.

Generally, however, the data transmission between the base station and the base station control device suffers a certain delay, and the data transmission from the base station control device to the base station also suffers a large delay. Therefore, it is difficult for the base station control device to control the number of mobile stations and the TFC sets depending on instantaneous noise rise changes.

Consequently, the conventional WCDMA wireless communication system has been required to set the number of mobile stations and the TFC sets in order to keep an average noise rise value sufficiently smaller than predetermined threshold value, thereby providing against sharp noise rise changes.

With the EUDCH, it is studied that the base station will indicate a TFC (maximum TFC) wherein the transmission power of an EUDCH is maximum, among TFCs that are allowed to be used, at a high speed to a mobile station, and the mobile station will select a TFC wherein the transmission power of an EUDCH is equal to or smaller than the transmission power of the EUDCH in the case where the maximum TFC indicated by the base station is used.

Since the above study makes it possible to reduce a variable noise rise range, the average noise rise value can be set to a higher level. In other words, since the number of mobile stations connected to the base station and the maximum power value of the maximum TFC can be set to higher values than heretofore, the coverage and capacity of the uplink are increased.

However, because the mobile station uses not only an EUDCH but also a DPCH referred to above, the mobile station needs to select a TFC also for the DPCH. Therefore, the mobile station has to select two TFCs, i.e., a TFC for the EUDCH and a TFC for the DPCH.

As described above, the mobile station determines the state of the mobile station for selecting TFCs based on whether the transmission power consumed when each TFC is used is greater than the maximum transmission power of the mobile station or not.

As shown in FIG. 2, for example, when the mobile station is to select a TFC for an EUDCH (hereinafter referred to as "E-TFC"), the mobile station may select an E-TFC4 wherein the transmission power of an EUDCH is represented by $P_{EUDCH}$ which smaller than the maximum transmission power $P_{max}$, and when the mobile station is to select a TFC for a DPCH, the mobile station may select a TFC6 wherein the transmission power of a DPCH is represented by $P_{PDCH}$ which is smaller than the maximum transmission power $P_{max}$.

However, when the mobile station transmits data simultaneously in the EUDCH and the DPCH, the sum ($P_{EUDCH}$+ $P_{PDCH}$) of the transmission power of the EUDCH and the transmission power of the DPCH exceeds the maximum transmission power $P_{max}$ of the mobile station, giving rise to a problem in that the mobile station suffers a shortage of transmission power.

In this case, it is necessary to reduce the transmission power of either one or both of the TFC and the E-TFC to make a power adjustment for reducing the total transmission power to a level equal to or smaller than the maximum transmission power $P_{max}$. However, another problem occurs in that the quality of data transmitted through the physical channel whose transmission power has been reduced is deteriorated.

DISCLOSURE OF THE INVENTION

It is therefore an object of the present invention to provide a transport format combination selecting method, wireless communication system, and mobile station which make it possible to select an E-TFC such that the total transmission power will not exceed the maximum power of a mobile station when the mobile station transmits data simultaneously in an EUDCH and a DPCH using an E-TFC and a DPCH that have been selected.

In a method of selecting a transport format combination according to the present invention, a mobile station selects a first TFC for use in data transmission in a first physical channel in an uplink between the mobile station and a base station from a plurality of first TFCs to be set for the first physical channel, and also selects a second TFC for use in data transmission in a second physical channel in the uplink from a plurality of second TFCs to be set for the second physical channel.

Specifically, the mobile station calculates the transmission power of the first physical channel using a first TFC with respect to each of first TFCs, compares the calculated transmission power with the maximum power of the mobile station, and determines whether the mobile station is in a transmission capable state or not based on the result of the comparison. Then, the mobile station calculates the sum of the transmission power of the first and second physical channels using first and second TFCs, with respect to each of combinations of the first and second TFCs, compares the calculated sum of the transmission power with the maximum power of the mobile station, and determines whether the mobile station is in the transmission capable state or not based o the result of the comparison. Then, the mobile station selects a first TFC from the first TFCs wherein the mobile station is in the transmission capable state. Then, the mobile station selects a second TFC from the second TFCs which are included in combinations wherein the mobile station is in the transmission capable state among the combinations including the selected first TFC. Thereafter, the mobile station transmits data in the first and second physical channels using the selected first and second TFCs, respectively.

According to the present invention, it is possible to select a second TFC based on the previously selected first TFC, such that the sum of the transmission power in the first and second physical channels will not exceed the maximum power of the mobile station. Therefore, as data can be transmitted without having to reduce the transmission power of the first and second physical channels, the quality of the data sent in the first and second physical channels is prevented from being lowered.

Furthermore, since the mobile station can select a second TFC in combination with a first TFC that is used in the actual transmission, a failure to assign transmission power to a second TFC due to the assignment of transmission power to a first TFC which is not in use is also prevented from occurring, and hence the power of the mobile station can effectively be used. Therefore, the throughput of the second physical channel is increased.

Moreover, the function to select a second TFC for use in the second physical channel can be added to the mobile station which has the function to select a first TFC for use in the first physical channel, without affecting the existing function to select a first TFC.

BRIEF DESCRIPTION OF THE DRAWINGS

FIG. 4 is a flowchart of an operation sequence of a mobile station of the wireless communication system according to the present invention, for determining a state of the mobile station;

FIG. 5 is a diagram showing an arrangement of a mobile station of a wireless communication system according to Embodiment 1 of the present invention;

FIG. 6A is a diagram showing a power offset table used in the mobile station of the wireless communication system according to Embodiment 1 of the present invention;

FIG. 6B is a diagram showing the power offset table used in the mobile station of the wireless communication system according to Embodiment 1 of the present invention;

FIG. 7A is a diagram showing a state management table used in the mobile station of the wireless communication system according to Embodiment 1 of the present invention;

FIG. 7B is a diagram showing the state management table used in the mobile station of the wireless communication system according to Embodiment 1 of the present invention;

FIG. 8 is a flowchart of an overall operation sequence of the mobile station of the wireless communication system according to Embodiment 1 of the present invention;

FIG. 11 is a diagram showing a state management table used in the mobile station of the wireless communication system according to Embodiment 2 of the present invention;

FIG. 17 is a flowchart of an overall operation sequence of the mobile station of the wireless communication system according to Embodiment 5 of the present invention.

BEST MODE FOR CARRYING OUT THE INVENTION

Figure 1:
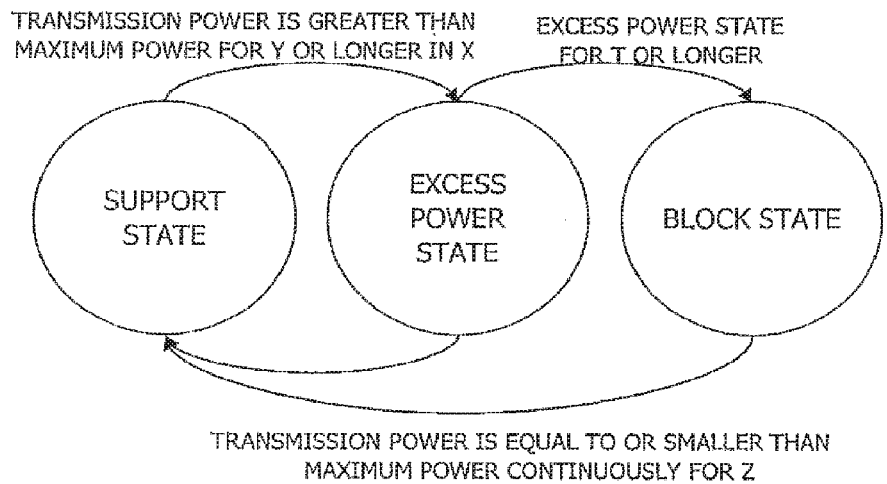
FIG. 1 is a diagram illustrative of the manner in which a mobile station of a conventional wireless communication system operates to determine a state of the mobile station.
Figure 2:
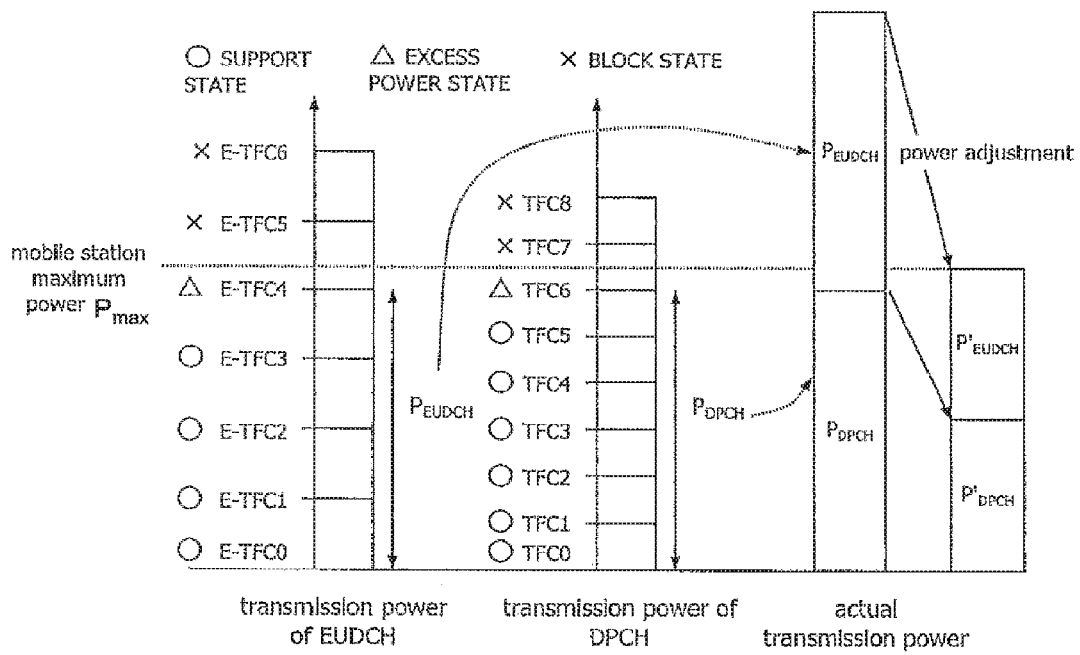
FIG. 2 is a diagram illustrative of the manner in which the mobile station of the conventional wireless communication system operates to select a TFC and an E-TFC.
Figure 3:
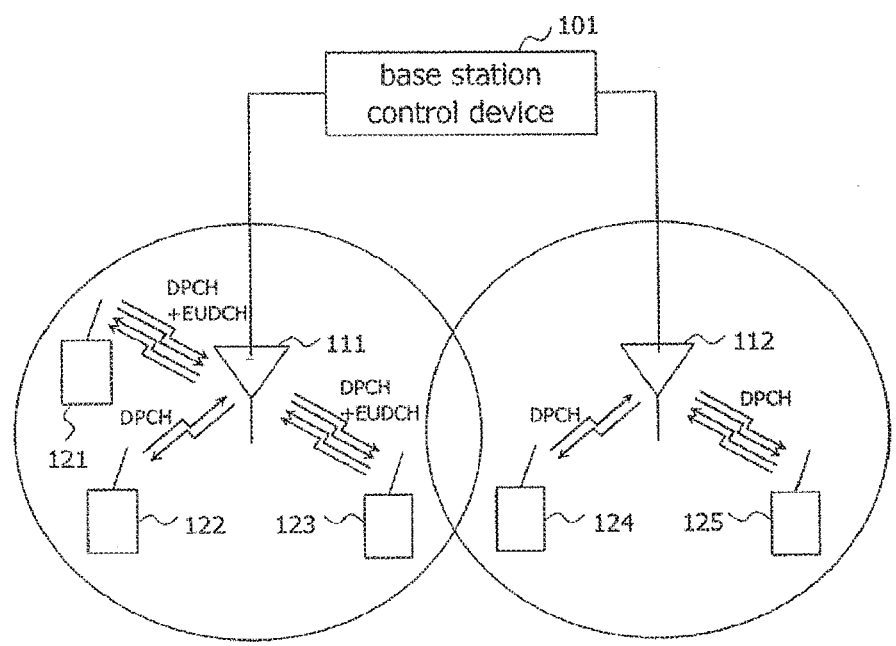
FIG. 3 is a diagram showing an arrangement of a wireless communication system according to the present invention.

As shown in FIG. 3, a wireless communication system according to the present invention has base station control device 101, base stations 111, 112 connected to base station control device 101, and mobile stations 121 through 125 connected to base station 111 or 112.

Though two base stations are connected to base station control device 101 in FIG. 3, the number of base stations connected to base station control device 101 is not limited to 2. Furthermore, though five mobile stations 121 through 125 connected to base stations 111, 112, the number of mobile stations is not limited to 5.

Base station 111 is a base station which is capable of receiving data in an EUDCH, and base station 112 is a base station which is incapable of receiving data in an EUDCH.

Therefore, mobile stations 124, 125 connected to base station 112 send data to and receive data from base station 112 only in a conventional DPCH. The DPCH includes a DPDCH for sending user data and a DPCCH for sending pilot data and control data.

Mobile stations 121, 123 connected to base station 111 are mobile stations which are capable of sending data in an EUDCH. Mobile stations 121, 123 send data to and receive data from base station 111 in a DPCH and an EUDCH. Specifically, through uplinks between mobile stations 121, 123 and base station 111, mobile stations 121, 123 send data in a DPCH and send data at a high speed in an EUDCH. Though downlinks between mobile stations 121, 123 and base station 111, base station 111 sends in a DPCH and sends control data in an EUDCH.

Mobile station 122 connected to base station 111 is a mobile station which is incapable of sending data in an EUDCH. Therefore, mobile station 122 sends data to and receives data from base station 111 only in a DPCH.

Base station control device 101 indicates a TFC set for DPCHs through base stations 111, 112 to mobile stations 121 through 125, and also indicates an E-TFC set for EUDCHs through base station 111 to mobile stations 121, 123.

Base station 111 measures the proportion (noise rise) of noise power in a desired wave of data received from mobile stations 121, 123 through the uplinks, updates maximum TFCs of DPCHs and maximum E-TFCs of EUDCHs of mobile stations 121, 123 at a predetermined time so that the noise rise will be equal to or smaller than a predetermined threshold, and indicates the updated maximum TFCs, E-TFCs to mobile stations 121, 123. Base station 111 also measures the proportion (noise rise) of noise power in a desired wave of data received from mobile station 122 through the uplink, updates maximum TFC of a DPCH of mobile station 122 at a predetermined time so that the noise rise will be equal to or smaller than a predetermined threshold, and indicates the updated maximum TFC to mobile station 122.

Base station 112 measures the proportion (noise rise) of noise power in a desired wave of data received from mobile stations 124, 125 through the uplinks, updates maximum TFCs of DPCHs of mobile stations 124, 125 at a predetermined time so that the noise rise will be equal to or smaller than a predetermined threshold, and indicates the updated maximum TFCs to mobile stations 124, 125.

Mobile stations 121, 123 determine states of the mobile stations when they use TFCs with respect to each of the TFCs included in the TFC set indicated from base station control device 101, and also determine states of the mobile stations when they use TFCs with respect to each combination of the TFCs included in the TFC set indicated from base station control device 101 and the E-TFCs included in the E-TFC set indicated from base station control device 101. Alternatively, mobile stations 121, 123 determines states of the mobile stations when they use the E-TFCs with respect to each of the E-TFCs included in the E-TFC set, instead of determining states of the mobile stations with respect to each combination of the TFCs and the E-TFCs. Then, mobile stations 121, 123 selects a TFC to be used for sending a DPCH and an E-TFC to be used for sending an EUDCH based on the determined states of the mobile stations.

Mobile stations 122, 124, 125 determine states of the mobile stations when they use TFCs with respect to each of the TFCs included in the TFC set indicated from base station control device 101, and select a TFC to be used for sending a DPCH based on the determined states of the mobile stations.

A process, which is carried out in mobile stations 121, 123 shown in FIG. 3, of determining states of mobile stations when they use TFCs, states of mobile stations when they use combinations of TFCs and E-TFCs, or states of mobile stations when they use E-TFCs, will be described below.

The process of determining states of mobile stations when they use TFCs will be described below with reference to a flowchart shown in FIG. 4. In determining states of mobile stations when they use TFCs, information relative to the transmission power of a DPCCH, reference power (the maximum power of their own mobile stations), TFC set, and power offset will be used. The power offset refers to the ratio of the transmission power of a DPCCH to the transmission power of a DPCH when the corresponding TFC is used.

Mobile stations 121, 123 determine states of the mobile stations in each unit transmission time with respect to each TFC. First, of a TFC set indicated from base station control device 101, a single TFC wherein a state of the mobile station has not been determined in the present unit transmission time is selected. With respect to the selected TFC, the transmission power of a DPCH when the TFC is used is calculated based on the information of the transmission power of a DPCCH and the power offset of the TFC, and recorded in a memory (step 101).

Then, it is determined whether the state of the mobile station when it uses the TFC is the support state (data transmission capable state) in the preceding unit transmission time or not (step 102). If it is the support state, then it is determined whether or not the number of times that the transmission power of the DPCH is equal to or greater than the reference power within a past time X is equal to or greater than Y (step 103).

If less than Y in step 103, then it is judged that the state of the mobile station when it uses the TFC is also the support state in the present unit transmission time (step 104). If equal to or greater than Y in step 103, then the it is judged that the state of the mobile station when it uses the TFC is the excess power state (data transmission capable state) in the present unit transmission time (step 105).

If the state of the mobile station is not the support state in step 102, then it is determined whether or not the transmission power of the DPCH when the mobile station uses the TFC is equal to or smaller than the reference power continuously for past time Z (step 106).

If the transmission power of the DPCH is equal to or smaller than the reference power continuously for time Z in step 106, then it is judged that the state of the mobile station when it uses the TFC is the support state in the present unit transmission time (step 104). If the transmission power of the DPCH is not equal to or smaller than the reference power continuously for time Z in step 106, then it is determined whether the state of the mobile station when it uses the TFC is the excess power state in the preceding unit transmission time or not (step 107).

If the state of the mobile station is not the excess power state in step 107, i.e., if it is the block state (data transmission incapable state), then it is judged that the state of the mobile station when it uses the TFC is also the block state in the present unit transmission time (step 108). If the state of the mobile station is the excess power state in step 107, then it is determined whether or not the excess power state of the mobile station when it uses the TFC has continued for past time T or more (step 109).

If the excess power state of the mobile station has continued for past time T or more in step 109, then it is judged that the state of the mobile station when it uses the TFC is the block state in the present unit transmission time (step 108). If the excess power state of the mobile station has not continued for past time T or more in step 109, then it is judged that the state of the mobile station when it uses the TFC is also the excess power state in the present unit transmission time (step 105).

Thereafter, it is determined whether the determination of the state of the mobile station with respect to all the TFCs is completed in the present unit transmission time or not (step 110). If not completed, then control goes back to step 101, and a process which is the same as the above process is carried out with respect to another TFC which has not been determined.

A process which is the same as the above process is also carried out for determining states of mobile stations 122, 124, 125.

Embodiment 1

An arrangement of mobile stations 121, 123 of a wireless communication system according to Embodiment 1 of the present invention will be described below with reference to FIG. 5.

As shown in FIG. 5, each of mobile stations 121, 123 has reception processor 301, control data separator 302, transmission power measuring unit 303, EUDCH transmission controller 304, DPCH transmission controller 305, and transmission processor 308.

Reception processor 301 receives data sent from base station 111.

Control data separator 302 separates the data received by reception processor 301 into user data and control data. Control data separator 302 sends information about the maximum E-TFC from the control data to E-TFC selector 307, and sends other user data and control data to a higher-level layer.

Of the control data set to the higher-level layer, the information of a TFC set sent from base station control device 101 through base station 111 is sent through the higher-level layer to TFC selector 310 and E-TFC selector 307. The information of an E-TFC set sent from base station control device 101 through base station 111 is sent through the higher-level layer to E-TFC selector 307. The information of the TFC set and the E-TFC set includes information about respective block sizes of the TFCs and the E-TFCs, TTI (Transmission Time Intervals), and coding rates.

Transmission power measuring unit 303 measures the transmission power of a DPCCH through the uplink in each unit transmission time, and indicates the measured result to TFC selector 310 and E-TFC selector 307.

TFC selector 310 calculates the transmission power of a DPCCH when the mobile station uses a TFC with respect to all TFCs included in the TFC indicated from base station control device 101, and updates the state of the mobile station when it uses the TFC according to the process shown in FIG. 4. TFC selector 310 also selects a TFC depending on the updated result of the state of the mobile station, the priority of each transport channel, and a required transmission rate, and indicates the selected TFC to E-TFC selector 307.

E-TFC selector 307 calculates the sum of the transmission power of a DPCH and the transmission power of an EUDCH when the mobile station uses an E-TFC and a TFC with respect to all combinations of E-TFCs included in the E-TFC set indicated from base station control device 101 and TFCs included in the TFC set indicated from base station control device 101, and updates the state of the mobile station when it uses the TFC and the TFC according to the process shown in FIG. 4. E-TFC selector 307 also selects an E-TFC depending on the updated result of the state of the mobile station, the TFC selected by TFC selector 310, the priority of each transport channel, and a required transmission rate.

TFC selector 310 and E-TFC selector 307 indicate the selected TFC and the selected E-TFC, respectively, to transmission processor 308.

Transmission processor 308 sends data stored in buffer 309 in a DPDCH to base station 111, and sends control data in a DPCCH to base station 111, using the TFC indicated from TFC selector 310. Transmission processor 308 also sends user data stored in buffer 306 in an EUDCH to base station 111, using the E-TFC indicated from E-TFC selector 307.

Operation of TFC selector 310 to select a TFC and operation of the E-TFC selector 307 to select an E-TFC will be described below with reference to FIGS. 6 and 7.

A power offset table indicative of power offsets for respective TFCs is shown in FIG. 6A, and a power offset table indicative of power offsets for respective combinations of E-TFCs and TFCs is shown in FIG. 6B. A state management table indicative of states of a mobile station for respective TFCs is shown in FIG. 7A, and a state management table indicative of states of a mobile station for respective combinations of E-TFCs and TFCs is shown in FIG. 7B. The tables shown in FIGS. 6A and 7A are held by TFC selector 310, and the tables shown in FIGS. 6B and 7B are held by E-TFC selector 307.

Since TFC selector 310 is notified of the information of a TFC set, TFC selector 310 generates the power offset table shown in FIG. 6A from the information. Since E-TFC selector 307 is notified of the information of a TFC set in addition to the information of an E-TFC set, E-TFC selector 307 generates the power offset table shown in FIG. 6B from these information.

TFC selector 310 calculates the transmission power of a DPCH when the mobile station uses a TFC with respect to each TFC, using the power offset table shown in FIG. 6A, and determines a state of the mobile station when it uses the TFC according to the process shown in FIG. 4. TFC selector 310 updates the contents of the state management table as shown in FIG. 7A. In FIG. 7A, "S" represents the support state, "E" the excess power state, and "B" block state. TFC selector 310 selects a TFC from the TFCs wherein the mobile station is in other than the block state, such that a TF having a high transmission rate is set in a transport channel with high priority and the transmission ratio does not exceed a required transmission rate. The selected TFC is indicated from TFC selector 310 to E-TFC selector 307.

E-TFC selector 307 calculates the sum of the transmission power of a DPCH and the transmission power of an EUDCH when the mobile station uses a TFC and an E-TFC with respect to each of combinations of TFCs and E-TFCs, using the power offset table shown in FIG. 6B, and determines a state of the mobile station when it uses the TFC and the E-TFC according to the process shown in FIG. 4. E-TFC selector 307 updates the contents of the state management table as shown in FIG. 7B.

Then, E-TFC selector 307 selects an E-TFC according to predetermined selecting conditions from the E-TFCs included in a combination which includes the TFC selected by TFCs selector 310. For example, it is assumed that TFC2 is selected (shown hatched in FIG. 7B). In this case, E-TFC selector 307 selects E-TFC1 wherein a transmission rate is higher as the priority is higher and does not exceed a required transmission rate as much as possible, from E-TFC1, E-TFC2 that are included in combinations wherein the mobile station is in other than the block state, of combinations (shown hatched in FIG. 7B) including TFC2.

According to the present embodiment, since mobile stations 121, 123 determine states of the mobile stations with respect to all combinations of TFCs and E-TFCs, it is possible to select an E-TFC such that the total transmission power will not exceed the maximum power of the mobile station, depending on the previously selected TFCs. Therefore, as the data can be transmitted without having to reduce the transmission power of each of the DPCH and the EUDCH, the quality of the data sent in the DPCH and the EUDCH is prevented from being lowered.

According to the present embodiment, furthermore, since mobile stations 121, 123 can select an E-TFC depending on the combination with a TFC that is used in the actual transmission, a failure to assign transmission power to an EUDCH due to the assignment of transmission power to a TFC which is not in use is also prevented from occurring, and hence the power of the mobile station can effectively be used. Therefore, the throughput of the EUDCH is increased.

An operation sequence of mobile stations 121, 123 of the wireless communication system according to Embodiment 1 of the present invention will be described below with reference to a flowchart shown in FIG. 8.

As shown in FIG. 8, transmission power measuring unit 303 measures the transmission power of a DPCCH in each predetermined unit transmission time (step 201).

Then, TFC selector 310 determines a state of the mobile station when it uses a TFC with respect to each TFC, according to the process shown in FIG. 4 (step 202). In determining a state of the mobile station, the maximum power of the mobile station is used as reference power.

Then, E-TFC selector 307 determines a state of the mobile station when it uses a TFC and an E-TFC with respect to each of combinations of TFCs and E-TFCs, according to the process shown in FIG. 4 (step 203). In determining a state of the mobile station, the maximum power of the mobile station is also used as reference power.

Then, TFC selector 310 and E-TFC selector 307 determine whether a time immediately prior to the transmission of data, i.e., a time to select a TFC and an E-TFC, is reached or not (step 204). The time is determined based on transmission time intervals (TTIs) included in the TFC set and the E-TFC set.

If the above time is reached in step 204, TFC selector 310 calculates a transmission rate required for each transport channel from the amount of data stored in buffer 309 for each transport channel of the DPCH. Then, TFC selector 310 selects a TFC such that a transmission rate for a transport channel with higher priority is higher and does not exceed a transmission rate required for each transport channel, from TFCs that are included in combinations wherein the mobile station is in other than the block state (step 205).

Then, E-TFC selector 307 calculates a transmission rate required for each transport channel from the amount of data stored in buffer 306 for each transport channel of the EUDCH. Then, E-TFC selector 307 selects an E-TFC such that a transmission rate for a transport channel with higher priority is higher and does not exceed a transmission rate required for each transport channel, from E-TFCs that are included in combinations wherein the mobile station is in other than the block state, of combinations including TFC selected as described above (step 206).

Thereafter, at a data transmission time, transmission processor 308 sends data to base station 111 in a DPCH using the TFC selected by TFC selector 310, and sends data to base station 111 in an EUDCH using the E-TFC selected by E-TFC selector 307 (step 207).

Mobile stations 121, 123 repeatedly perform the above operation sequence in each predetermined unit transmission time.

According to the present embodiment, as described above, since mobile stations 121, 123 determine states of the mobile stations with respect to all combinations of TFCs and E-TFCs, it is possible to select an E-TFC such that the total transmission power will not exceed the maximum power of the mobile station, depending on the previously selected TFCs. Therefore, as the data can be transmitted without having to reduce the transmission of each of the DPCH and the EUDCH, the quality of the data sent in the DPCH and the EUDCH is prevented from being lowered.

According to the present embodiment, furthermore, since mobile stations 121, 123 can select an E-TFC depending on the combination with a TFC that is used in the actual transmission, a failure to assign transmission power to an EUDCH due to the assignment of transmission power to a TFC which is not in use is also prevented from occurring, and hence the power of the mobile station can effectively be used. Therefore, the throughput of the EUDCH is increased.

According to the present embodiment, additionally, the E-TFC selecting function of an EUDCH can be added to mobile stations 121, 123 without affecting the existing TFC selecting function of a DPCH.

Embodiment 2

An arrangement of base station control device 101 of a wireless communication system according to Embodiment 2 of the present invention will be described below with reference to FIG. 9.

Figure 9:
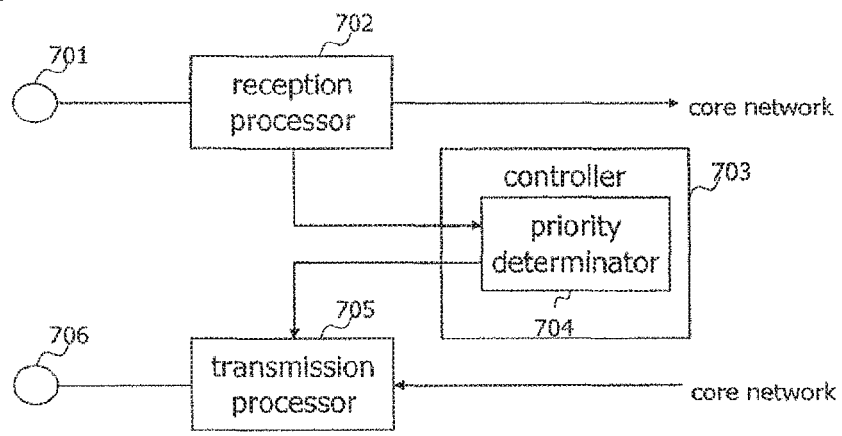
FIG. 9 is a diagram showing an arrangement of a base station control device of a wireless communication system according to Embodiment 2 of the present invention.

As shown in FIG. 9, base station control device 101 according to the present embodiment has reception terminal 701, reception processor 702, controller 703, transmission processor 705, and transmission terminal 706.

Reception terminal 701 is connected to base stations 111, 112, and receives user data and control data from mobile stations 121 through 125 through base stations 111, 112.

Reception processor 702 separates the data received by reception terminal 701 into user data and control data, sends the user data from a higher-level layer to a core network, and sends the control data to controller 703. The control data includes information about a service for sending data in a DPCH and an EUDCH.

Controller 703 has priority determinator 704 therein for determining priority representative of which one of TFC selection and E-TFC selection is to be processed with priority, based on the above information about the service included in the control data from reception processor 702, and sends information about the determined priority to transmission processor 705.

Transmission processor 705 multiplexes the information about the priority from priority determinator 704 with the other user data and control data, and sends the multiplexed data from transmission terminal 706 through base stations 111, 112 to a corresponding mobile station (mobile stations 121, 123 in the present embodiment).

An arrangement of mobile stations 121, 123 of the wireless communication system according to Embodiment 2 of the present invention will be described below with reference to FIG. 10.

Figure 10:
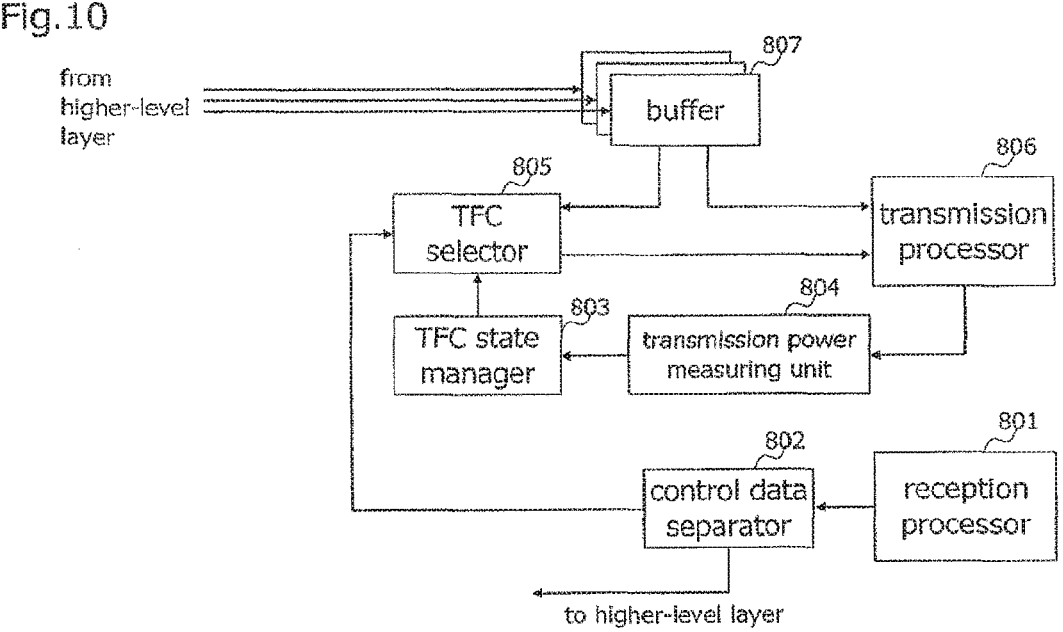
FIG. 10 is a diagram showing an arrangement of mobile station of the wireless communication system according to Embodiment 2 of the present invention.

As shown in FIG. 10, each of mobile stations 121, 123 according to the present embodiment has reception processor 801, control data separator 802, TFC state manager 803, transmission power measuring unit 804, TFC selector 805, transmission processor 806, and buffer 807.

Reception processor 801 receives data sent from base station 111.

Control data separator 802 separates the data received by reception processor 801 into user data and control data. Control data separator 802 sends the information about the priority with respect to the TFC selection and the E-TFC selection to E-TFC selector 805, and sends other user data and control data to a higher-level layer.

Transmission power measuring unit 803 measures the transmission power of a DPCCH through the uplink in each unit transmission time, and indicates the measured result to TFC state manager 803.

TFC state manager 803 calculates the sum of the transmission power of an EUDCH and the transmission power of a DPCH when the mobile station transmits data using an E-TFC and a TFC with respect to all combinations of TFCs and E-TFCs, using the information about the transmission power of the DPCCH and the information about the power offset with respect to each of the combinations of TFCs and E-TFCs, and determines a state of the mobile station when it uses the E-TFC and the TFC according to the process shown in FIG. 4.

TFC selector 805 first selects one of a TFC and an ETFC with higher priority based on the information about the priority from control signal separator 802 at a predetermined TFC selection time, and thereafter selects the other one depending on the selected TFC or E-TFC. TFC selector 805 indicates the selected TFC and E-TFC to transmission processor 806.

Transmission processor 806 sends the user data of the DPCH stored in buffer 807 in a DPDCH to base station 111 and also sends the control data in a DPCCH to base station 111, using the TFC indicated from TFC selector 805. Transmission processor 806 also sends the user data of the EUDCH stored in buffer 807 in an EUDCH to base station 111, using the E-TFC indicated from TFC selector 805.

Operation of TFC selector 805 to select a TFC and an E-TFC will be described in detail below with reference to FIG. 11.

A state management table indicative of states of a mobile station for respective combinations of E-TFCs and TFCs is shown in FIG. 11. The table shown in FIG. 11 is held by TFC state manager 803.

The present embodiment differs from Embodiment 1 in that mobile stations 121, 123 manages only one state management table indicative of states of a mobile station for respective combinations of TFCs and E-TFCs and that a sequence for carrying out the TFC selection and the E-TFC selection can be changed based on the information about the priority indicated from base station control device 101.

First, TFC selector 805 determines which one of the TFC selection and the E-TFC selection has higher priority. It is assumed here that the E-TFC selection has higher priority than the TFC selection.

Then, TFC selector 805 selects an E-TFC from E-TFC0, E-TFC1, E-TFC2, E-TFC3 included in combinations wherein the mobile station is in other than the block state, based on the state management table shown in FIG. 11, depending on the priority of each transport channel of an EUDCH and the amount of data stored in buffer 807. At this time, TFC selector 805 selects an E-TFC such that a transmission rate for a transport channel with higher priority among transport channels of EUDCHs is higher and does not exceed a required transmission rate.

Thereafter, TFC selector 805 selects a TFC from TFCs included in combinations wherein the mobile station is in other than the block state, of combinations including the previously selected E-TFC, based on the state management table shown in FIG. 11, depending on the priority of each transport channel of a DPCH and the amount of data stored in buffer 807.

It is assumed that TFC selector 805 selects E-TFC3, for example, in FIG. 11. In this case, TFC selector 805 selects TFC0 included in a combination wherein the mobile station is in other than the block state, of combinations (shown hatched in FIG. 11) including E-TFC3.

According to the present embodiment, since mobile stations 121, 123 determine states of the mobile stations with respect to all combinations of TFCs and E-TFCs, it is possible to select an E-TFC or a TFC such that the total transmission power will not exceed the maximum power of the mobile station, depending on the previously selected TFCs or E-TFCs. Therefore, the quality of the data sent in the DPCH and the EUDCH is prevented from being lowered.

According to the present embodiment, furthermore, after one of a TFC and an E-TFC is selected in mobile stations 121, 123, the E-TFC or the TFC can be selected in order to effectively use the power of the remaining mobile station. Therefore, the throughput is increased.

According to the present embodiment, moreover, base station control device 101 determines the priority about the TFC selection and the E-TFC selection, and indicates the priority to mobile stations 121, 123. Consequently, it is possible to assign the power of the mobile station with priority to a channel which provides a service with strict requirements against data delays, such as a distribution service for audio data and streaming, for example. Therefore, the quality of the service is increased.

An operation sequence of mobile stations 121, 123 of the wireless communication system according to Embodiment 2 of the present invention will be described below with reference to a flowchart shown in FIG. 12. The present embodiment differs from Embodiment 1 in that only a state of the mobile station is determined with respect to combinations of TFCs and E-TFCs (step 302) and that a sequence for selecting a TFC and an E-TFC is determined depending on the priority of a TFC and an E-TFC (step 304).

Figure 12:
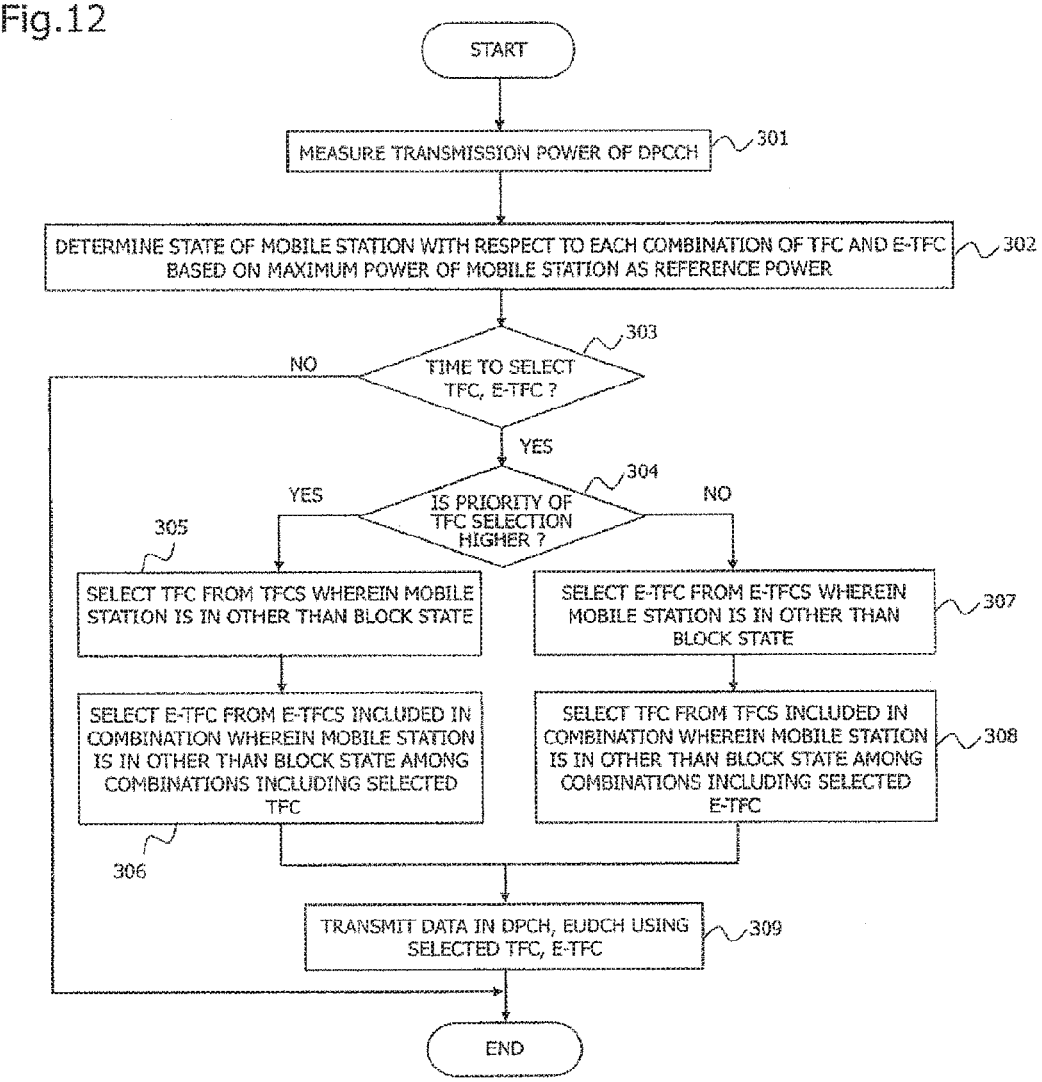
FIG. 12 is a flowchart of an overall operation sequence of the mobile station of the wireless communication system according to Embodiment 2 of the present invention.

As shown in FIG. 12, transmission power measuring unit 804 measures the transmission power of a DPCCH in each predetermined unit transmission time (step 301).

Then, TFC state manager 803 determines a state of the mobile station when it uses a TFC and an E-TFC with respect to all combinations of TFCs and E-TFCs (step 302).

Then, TFC selector 805 determines whether a time immediately prior to the transmission of data, i.e., a time to select a TFC and an E-TFC, is reached or not (step 303). If the time is reached, then TFC selector 805 determines which one of the TFC selection and the E-TFC selection has higher priority (step 304).

If the TFC selection has higher priority in step 304, then TFC selector 805 calculates a transmission rate required for each transport channel from the amount of data stored in buffer 807 for each transport channel of a DPCH. Then, TFC selector 805 selects a TFC such that a transmission rate for a transport channel with higher priority is higher and does not exceed a transmission rate required for each transport channel, from TFCs that are included in combinations wherein the mobile station is in other than the block state (step 305). Then, TFC selector 805 calculates a transmission rate required for each transport channel from the amount of data stored in buffer 807 for each transport channel of the EUDCH. Then, TFC selector 805 selects an E-TFC such that a transmission rate for a transport channel with higher priority is higher and does not exceed a transmission rate required for each transport channel, from E-TFCs that are included in combinations wherein the mobile station is in other than the block state, of combinations including the TFC selected as described above (step 306).

If the E-TFC selection has higher priority in step 304, then TFC selector 805 calculates a transmission rate required for each transport channel from the amount of data stored in buffer 807 for each transport channel of an EUDCH. Then, TFC selector 805 selects an E-TFC such that a transmission rate for a transport channel with higher priority is higher and does not exceed a transmission rate required for each transport channel, from E-TFCs that are included in combinations wherein the mobile station is in other than the block state (step 307). Then, TFC selector 805 calculates a transmission rate required for each transport channel from the amount of data stored in buffer 807 for each transport channel of the DPCH. Then, TFC selector 805 selects a TFC such that a transmission rate for a transport channel with higher priority is higher and does not exceed a transmission rate required for each transport channel, from TFCs that are included in combinations wherein the mobile station is in other than the block state, of combinations including the E-TFC selected as described above (step 308).

Thereafter, at a data transmission time, transmission processor 803 sends data to base station 111 in a DPCH and an EUDCH using the TFC and the E-TFC selected by TFC selector 805 (step 309).

Mobile stations 121, 123 repeatedly perform the above operation sequence in each predetermined unit transmission time.

According to the present embodiment, as described above, the function to control the priority about the TFC selection and the E-TFC selection depending on the kind of the service, in addition to the function of Embodiment 1, is added to base station control device 101.

Therefore, in addition to the advantages of Embodiment 1, it is possible to assign the power of the mobile station with priority to a channel which provides a service with strict requirements against data delays, such as a distribution service for audio data and streaming, for example. Therefore, the quality of the service is increased.

Embodiment 3

An arrangement of mobile stations 121, 123 of a wireless communication system according to Embodiment 3 of the present invention is the same as the arrangement of Embodiment 1 shown in FIG. 5, and will be omitted from illustration.

The manner in which mobile stations 121, 123 of the wireless communication system according to Embodiment 3 of the present invention operate to select a TFC and an E-TFC will be described below with reference to FIG. 13.

TFC selector 310 determines a state of the mobile station when it uses each TFC, based on the maximum power of the mobile station as reference power. In FIG. 13, irrespectively of which one of TFC0 through TFC5 is used, the state of the mobile station is judged as the support state because the transmission power is smaller than the reference power. It is assumed here that since the transmission rate required for a DPCH is smaller than the maximum TFC, transmission processor 308 is presently sending data in a DPCH using TFC3.

Figure 13:
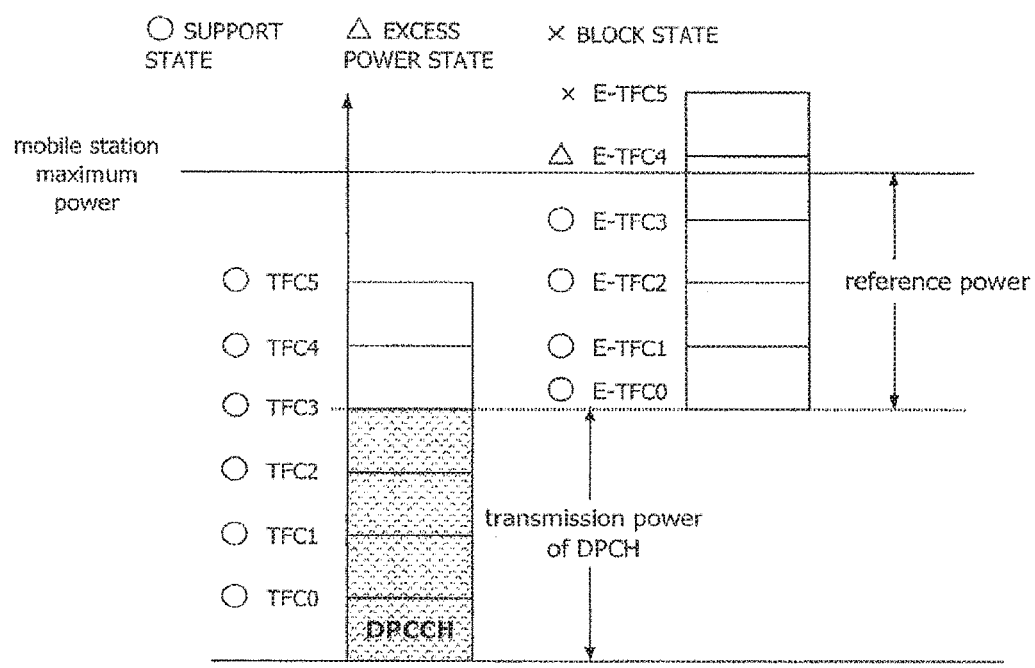
FIG. 13 is a diagram illustrative of the manner in which a mobile station of a wireless communication system according to Embodiment 3 of the present invention operates to determine a state of the mobile station.

E-TFC selector 307 determines a state of the mobile station when it uses each E-TFC, based on the remaining power as reference power, which is produced by subtracting the present transmission power of the DPCH from the maximum power of the mobile station, as shown in FIG. 13. Specifically, E-TFC selector 307 determines a state of the E-TFC based on the transmission power that can actually be assigned to the EUDCH, in each unit transmission time. The transmission power of the DPCH is measured by transmission power measuring unit 303.

Generally, a continuous data transmission time is longer than a predetermined period for selecting a TFC, and traffic variations have a certain correlation in terms of time. When data are sent in a DPCH at predetermined transmission time intervals, the power required to send the data in the DPCH is considered to be close to the power required to send the data in the DPCH after a next transmission time interval has elapsed.

According to the present embodiment, therefore, the probability that an E-TFC wherein the total transmission power upon elapse of a next transmission time interval does not exceed the maximum power of the mobile station can be selected is increased. By selecting such an E-TFC, the quality of data sent in the DPCH and the EUDCH is prevented from being lowered. Furthermore, the possibility of keeping transmission power for a TFC that is not in use is reduced. Therefore, the throughput of the EUDCH is increased.

For example, if the traffic of a DPCH is high, then the present transmission power of the DPCH is high. Since the reference power used to determine a state of the mobile station with respect to each E-TFC is reduced, the mobile station when an E-TFC including a transport channel with a high transmission rate is selected is in the block state.

Conversely, if the traffic of a DPCH is low, then the reference power used to determine a state of the mobile station with respect to each E-TFC is increased. Consequently, an E-TFC including a transport channel with a high transmission rate can be selected.

According to the present embodiment, as described above, it is possible for mobile stations 121, 123 to select an E-TFC such that the total transmission power of the DPCH and the EUDCH is equal to or smaller than the maximum power of the mobile station and the transmission rate of the EUDCH is as high as possible, depending on the traffic of the DPCH. At this time, a TFC for use in a DPCH is selected based on the maximum power as heretofore. Consequently, the E-TFC selecting function of an EUDCH can be added to mobile stations 121, 123 without affecting the existing TFC selecting function of a DPCH.

According to the present embodiment, unlike Embodiment 1, mobile stations 121, 123 may determine one state with respect to each E-TFC, and hence the amount of calculations required for determining a state can be reduced.

An operation sequence of mobile stations 121, 123 of the wireless communication system according to Embodiment 3 of the present invention will be described below with reference to a flowchart shown in FIG. 14.

Figure 14:
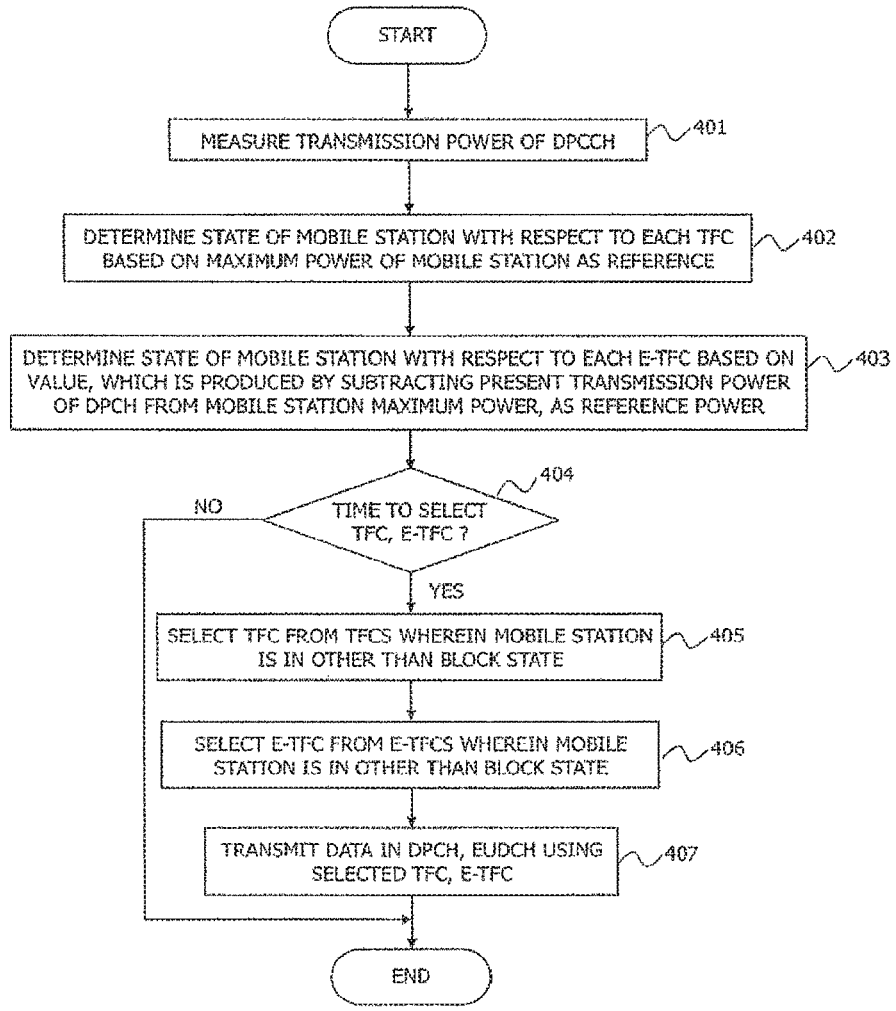
FIG. 14 is a flowchart of an overall operation sequence of the mobile station of the wireless communication system according to Embodiment 3 of the present invention.

As shown in FIG. 14, transmission power measuring unit 303 measures the transmission power of a DPCCH in each predetermined unit transmission time (step 401).

Then, TFC selector 310 determines a state of the mobile station when it uses a TFC with respect to each TFC, according to the process shown in FIG. 4 (step 402). In determining a state of the mobile station, the maximum power of the mobile station is used as reference power.

Then, E-TFC selector 307 determines a state of the mobile station when it uses an E-TFC with respect to each TFC, according to the process shown in FIG. 4 (step 403). In determining a state of the mobile station, the remaining power, which is produced by subtracting the present transmission power of the DPCH from the maximum power of the mobile station, is used as reference power.

Then, TFC selector 310 and E-TFC selector 307 determine whether a time immediately prior to the transmission of data, i.e., a time to select a TFC and an E-TFC, is reached or not (step 404). The time is determined based on transmission time intervals (TTIs) included in the TFC set and the E-TFC set.

If the above time is reached in step 404, TFC selector 310 calculates a transmission rate required for each transport channel from the amount of data stored in buffer 309 for each transport channel of the DPCH. Then, TFC selector 310 selects a TFC such that a transmission rate for a transport channel with higher priority is higher and does not exceed a transmission rate required for each transport channel, from TFCs wherein the mobile station is in other than the block state (step 405).

Then, E-TFC selector 307 calculates a transmission rate required for each transport channel from the amount of data stored in buffer 306 for each transport channel of the EUDCH. Then, E-TFC selector 307 selects an E-TFC such that a transmission rate for a transport channel with higher priority is higher and does not exceed a transmission rate required for each transport channel, from E-TFCs wherein the mobile station is in other than the block state (step 406).

Thereafter, at a data transmission time, transmission processor 308 sends data to base station 111 in a DPCH using the TFC selected by TFC selector 310, and sends data to base station 111 in an EUDCH using the E-TFC selected by E-TFC selector 307 (step 407).

Mobile stations 121, 123 repeatedly perform the above operation sequence in each predetermined unit transmission time.

According to the present embodiment, as described above, mobile stations 121, 123 determine a state of the E-TFC using the remaining power, which is produced by subtracting the present transmission power of the DPCH from the maximum power of the mobile station, i.e., the transmission power assignable to the EUDCH, as reference power. Therefore, it is possible to increase the probability that the total transmission power of the DPCH and the EUDCH will not exceed the maximum power depending on the traffic of the DPCH. Moreover, the quality of data sent in the DPCH and the EUDCH is prevented from being lowered. If the traffic of a DPCH is low, then since an E-TFC including a transport channel with a high transmission rate can be selected accordingly, the throughput of the EUDCH is increased.

According to the present embodiment, additionally, the TFC selecting function of an EUDCH can be added to mobile stations 121, 123 without affecting the existing TFC selecting function of a DPCH.

According to the present embodiment, unlike Embodiment 1, mobile stations 121, 123 may determine one state with respect to each E-TFC, and hence the amount of calculations required for determining a state can be reduced.

Embodiment 4

The present embodiment differs from Embodiment 3 described above in that when the TFC selected by TFC selector 310 varied from the preceding TFC, the state of the mobile station when it uses each E-TFC is adjusted.

Figure 15:
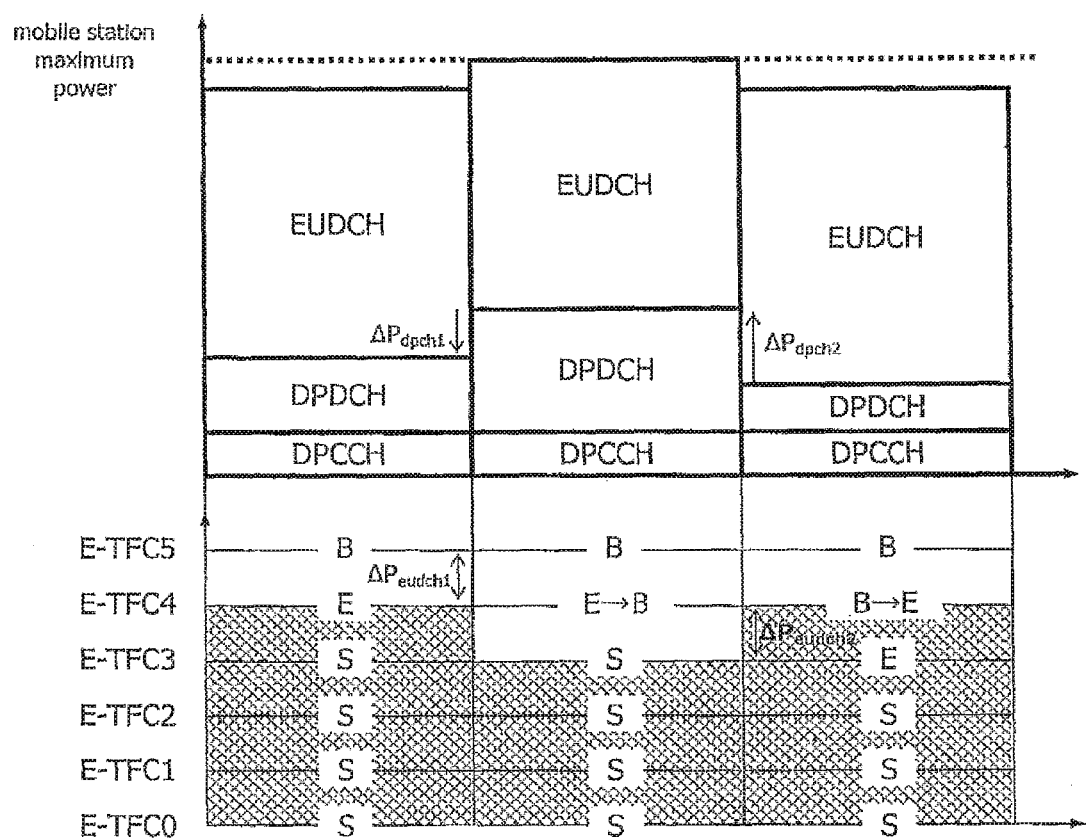
FIG. 15 is a diagram illustrative of the manner in which a mobile station of a wireless communication system according to Embodiment 4 of the present invention operates to determine a state of the mobile station.

For example, as shown in FIG. 15, it is assumed that the transmission power of a DPDCH using a selected TFC is higher than the transmission power of a DPDCH using a preceding TFC by $\Delta P_{dpch1}$=the transmission power of a DPCCH×($\Delta$crr−$\Delta$pre) where $\Delta$crr represents a power offset with respect to a DPCCH of the selected TFC and $\Delta$pre a power offset with respect to a DPCCH of the preceding TFC. E-TFC selector 307 calculates the difference $\Delta P_{eudch1}$=the transmission power of a DPCCH×($\Delta$etfc5−$\Delta$etfc4) between E-TFC5 wherein the transmission power of an EUDCH is minimum among E-TFCs wherein the mobile station is in the block state and E-TFC4 wherein the transmission power is the largest next after E-TFC5. At this time, if $\Delta P_{dpch1}$ is greater than $\Delta P_{eudch1}$, then E-TFC selector 307 sets the state of the mobile station with respect to E-TFC4 to the block state. $\Delta$etfc4 represents a power offset with respect to a DPCCH of E-TFC4 and $\Delta$etfc5 a power offset with respect to a DPCCH of E-TFC5.

Conversely, it is assumed that the transmission power of a DPDCH using a selected TFC is lower than the transmission power of a DPDCH using a preceding TFC by $\Delta P_{dpch2}$. E-TFC selector 307 calculates the difference $\Delta P_{eudch2}$ between E-TFC3 wherein the transmission power of an EUDCH is minimum among E-TFCs wherein the mobile station is in the block state and E-TFC4 wherein the transmission power is the largest next after E-TFC3. At this time, if $\Delta P_{eudch2}$ is smaller than $\Delta P_{dpch2}$, then E-TFC selector 307 sets the state mobile station with respect to E-TFC4 to the excess power state.

According to the present embodiment, as described above, even if the TFC of the DPCH is varied, mobile stations 121, 123 can select an E-TFC by adjusting the states of the mobile stations when they use the E-TFC depending on an increase or a decrease in the transmission power of the DPCH due to the variations of the TFC. In addition to the advantages offered by Embodiment 3, therefore, the probability that the sum of the transmission power of a DPCH and the transmission power of an EUDCH using the selected TFC and E-TFC will be equal to or smaller than the maximum power of the mobile station is further increased, so that the quality of the data sent in the DPCH and the EUDCH is prevented from being lowered.

According to the present embodiment, furthermore, the possibility of keeping transmission power for a TFC that is not in use is reduced. Therefore, the throughput of the EUDCH is increased.

Embodiment 5

An arrangement of mobile stations 121, 123 of a wireless communication system according to Embodiment 5 of the present invention is the same as the arrangement of Embodiment 1 shown in FIG. 5, and will be omitted from illustration.

The manner in which mobile stations 121, 123 of the wireless communication system according to Embodiment 5 of the present invention operate to select a TFC and an E-TFC will be described below with reference to FIG. 16.

TFC selector 310 determines a state of the mobile station when it uses each TFC, based on the maximum power of the mobile station as reference power. In FIG. 16, irrespectively of which one of TFC0 through TFC5 is used, the state of the mobile station is judged as the support state because the transmission power is smaller than the reference power. It is assumed here that TFC selector 310 has selected TFC3.

Figure 16:
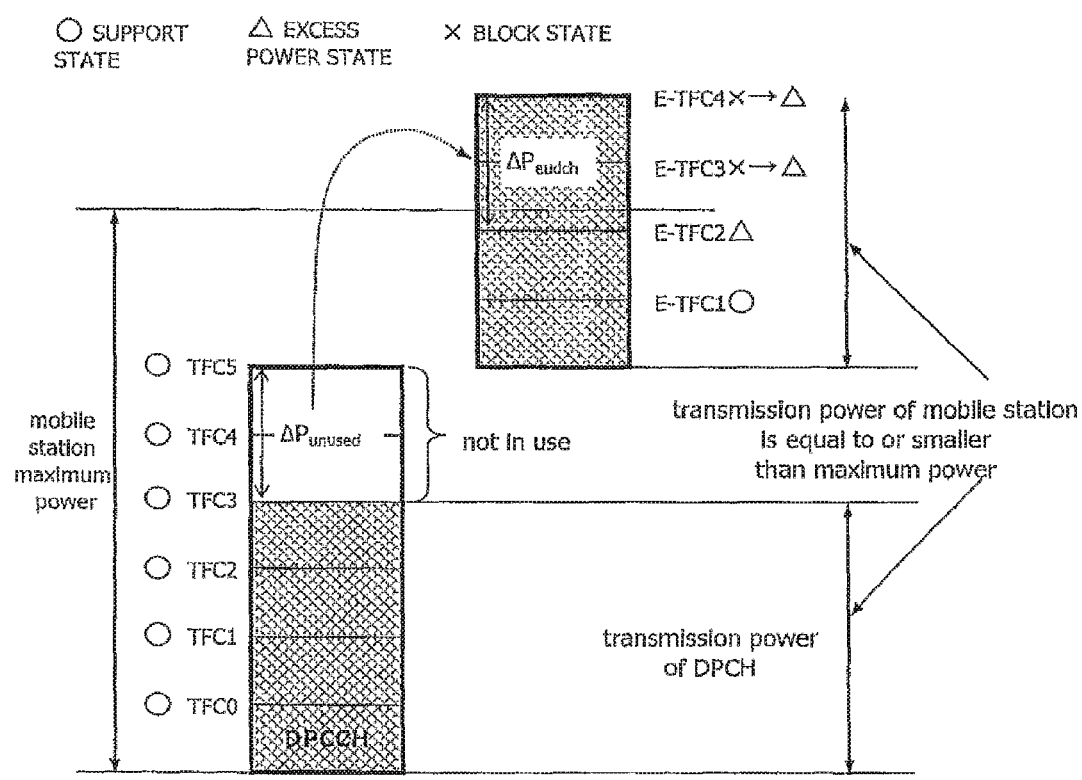
FIG. 16 is a diagram illustrative of the manner in which a mobile station of a wireless communication system according to Embodiment 5 of the present invention operates to determine a state of the mobile station.

E-TFC selector 307 determines a state of the mobile station when it uses each TFC, based on the remaining power as reference power, which is produced by subtracting the transmission power of the DPCH when the mobile station uses the TFC (maximum TFC) where the transmission power of the TFC is maximum from the maximum power of the mobile station, as shown in FIG. 16. Therefore, even if TFC selector 310 selects the maximum TFC, E-TFC selector 307 can select an E-TFC such that the sum of the transmission power of a DPCH and the transmission power of an EUDCH will be equal to or smaller than the maximum power of the mobile station.

If there is an E-TFC wherein the mobile station is in the block state, then after a TFC has been selected by TFC selector 310, E-TFC selector 307 calculates the difference $\Delta P_{unused}$ between the transmission power of a DPCH using the maximum TFC wherein the mobile station is other than the block state and the transmission power is maximum and the transmission power of a DPCH using the selected TFC. Then, E-TFC selector 307 calculates the difference $\Delta P_{eudch}$ between the transmission power of E-TFCs, in a descending order of power offsets, wherein the mobile station is in the block state, and the transmission power of an E-TFC wherein the transmission power of an EUDCH is the highest among E-TFCs wherein the mobile station is in other than the block state. If $\Delta P_{unused}$ is greater than $\Delta P_{eudch}$, then E-TFC selector 307 sets the state of the mobile station when it uses the corresponding E-TFC to the excess power state.

For example, in FIG. 16, the mobile station is in the transmission capable state up to E-TFC2. However, if higher E-TFCs are used, the mobile station is in the block state (transmission incapable state). In a DPCH, since the mobile station sends data using TFC3, the power of the mobile station would be unused by $\Delta P_{unused}$.

E-TFC selector 307 compares the difference $\Delta P_{eudch1}$ between the transmission power of E-TFC3 wherein the mobile station is in the block state and the transmission power of E-TFC2 wherein the transmission power of an EUDCH is the highest among E-TFCs wherein the mobile station is in other than the block state, with $\Delta P_{unused}$. Since $\Delta P_{unused}$ is greater than $\Delta P_{eudch1}$ in this case, E-TFC selector 307 changes the state of the mobile station using E-TFC3 to the excess power state. Similarly, E-TFC selector 307 compares the difference $\Delta P_{eudch2}$ between the transmission power of E-TFC4 and the transmission power of E-TFC2 with $\Delta P_{unused}$. Since $\Delta P_{unused}$ is greater than $\Delta P_{eudch1}$ also in this case, E-TFC selector 307 changes the state of the mobile station using E-TFC4 to the excess power state.

According to the present embodiment, as described above, mobile stations 121, 123 can select up to E-TFCs including transport channels with higher transmission rates, and hence the power of the mobile stations can effectively be used. Therefore, the throughput of the EUDCH is increased.

According to the present embodiment, furthermore, mobile stations 121, 123 select a TFC for use in a DPCH based on the maximum power as heretofore. Consequently, the E-TFC selecting function of an EUDCH can be added to mobile stations 121, 123 without affecting the existing TFC selecting function.

According to the present embodiment, unlike Embodiment 1, mobile stations 121, 123 may determine one state with respect to each E-TFC, and hence the amount of calculations required for determining a state can be reduced.

An operation sequence of mobile stations 121, 123 of the wireless communication system according to Embodiment 5 of the present invention will be described below with reference to a flowchart shown in FIG. 17.

As shown in FIG. 17, transmission power measuring unit 303 measures the transmission power of a DPCCH in each predetermined unit transmission time (step 501).

Then, TFC selector 310 determines a state of the mobile station when it uses a TFC with respect to each TFC, according to the process shown in FIG. 4 (step 502). In determining a state of the mobile station, the maximum power of the mobile station is used as reference power.

Then, E-TFC selector 307 determines a state of the mobile station when it uses an E-TFC with respect to each TFC, according to the process shown in FIG. 4 (step 503). In determining a state of the mobile station, the remaining power, which is produced by subtracting the transmission power of the DPCH wherein the mobile station is in other than the block state and the transmission power of the DPCH is maximum from the maximum power of the mobile station, is used as reference power.

Then, TFC selector 310 and E-TFC selector 307 determine whether a time immediately prior to the transmission of data, i.e., a time to select a TFC and an E-TFC, is reached or not (step 504). The time is determined based on transmission time intervals (TTIs) included in the TFC set and the E-TFC set.

If the above time is reached in step 504, TFC selector 310 calculates a transmission rate required for each transport channel from the amount of data stored in buffer 309 for each transport channel of the DPCH. Then, TFC selector 310 selects a TFC such that a transmission rate for a transport channel with higher priority is higher and does not exceed a transmission rate required for each transport channel, from TFCs wherein the mobile station is in other than the block state (step 505).

Then, E-TFC selector 307 calculates the difference $\Delta P_{unused}$ between the transmission power of the DPCH of a TFC wherein the transmission power of the DPCH is maximum and the transmission power of the DPCH of the selected TFC. Then, E-TFC selector 307 calculates the difference $\Delta P_{eudch}$ between the transmission power of the EUDCH of E-TFCs, in a descending order of power offsets, wherein the mobile station is in the block state, and the transmission power of the EUDCH of an E-TFC wherein the transmission power of the EUDCH is the greatest among E-TFCs wherein the mobile station is in other than the block state. If $\Delta P_{eudch}$ is smaller than $\Delta P_{unused}$, then E-TFC selector 307 sets the state of the mobile station when it uses the corresponding E-TFC to the excess power state (step 506).

Then, E-TFC selector 307 calculates a transmission rate required for each transport channel from the amount of data stored in buffer 306 for each transport channel of the EUDCH. Then, E-TFC selector 307 selects an E-TFC such that a transmission rate for a transport channel with higher priority is higher and does not exceed a transmission rate required for each transport channel, from E-TFCs wherein the mobile station is in other than the block state (step 507).

Thereafter, at a data transmission time, transmission processor 308 sends data to base station 111 in a DPCH using the TFC selected by TFC selector 310, and sends data to base station 111 in an EUDCH using the E-TFC selected by E-TFC selector 307 (step 508).

Mobile stations 121, 123 repeatedly perform the above operation sequence in each predetermined unit transmission time.

According to the present embodiment, as described above, mobile stations 121, 123 determines a state of the E-TFC based on the remaining power as reference power, which is produced by subtracting the transmission power of a DPCH using the maximum TFC wherein the mobile station is in other than the block state and the transmission power of the DPCH is maximum, from the maximum power of the mobile station. Thereafter, depending on the difference between the transmission power of the DPCH using the maximum TFC and the transmission power of the DPCH using the selected TFC, the state of the mobile station with respect to the corresponding E-TFC is changed from the block state to the excess power state.

Consequently, even if the traffic of a DPCH is changed, it is possible to increase the probability that an E-TFC will be selected so that the total transmission power of the DPCH and the EUDCH will not exceed the maximum power, and the quality of data sent in the DPCH and the EUDCH is prevented from being lowered. If the traffic of a DPCH is low, then since an E-TFC including a transport channel with a high transmission rate can be selected accordingly, the throughput of the EUDCH is increased.

According to the present embodiment, additionally, the TFC selecting function of an EUDCH can be added to mobile stations 121, 123 without affecting the existing TFC selecting function of a DPCH.

According to the present embodiment, unlike Embodiment 1, mobile stations 121, 123 may determine one state with respect to each E-TFC, and hence the amount of calculations required for determining a state can be reduced.

Embodiment 6

According to Embodiment 6 of the present invention, the priority of the TFC selection and the E-TFC selection is determined depending on the contents of a service provided in a DPCH and a service provided in an EUDCH, and the processing on a DPCH and the processing on an EUDCH according to Embodiment 3 are reversed depending on the determined priority.

Specifically, if the priority of the TFC selection is higher, then the TFC selection and the E-TFC selection are performed as described above in Embodiment 3. If the priority of the E-TFC selection is higher, then a state of the mobile station when it uses each TFC is determined based on the remaining power as reference power, which is produced by subtracting the present transmission power of an EUDCH from the maximum power of the mobile station.

According to the present invention, therefore, it is possible to assign the power of the mobile station with priority to a channel which provides a service with strict requirements against data delays, such as a distribution service for audio data and streaming, for example. Therefore, the quality of the service is increased.

The priority of the DPCH and the EUDCH may be determined by base station control device 101 and indicated to mobile stations 121, 123, or may be determined by mobile stations 121, 123.

Embodiment 7

According to Embodiment 7 of the present invention, the priority of the TFC selection and the E-TFC selection is determined depending on the contents of a service provided in a DPCH and a service provided in an EUDCH, and the processing on a DPCH and the processing on an EUDCH according to Embodiment 5 are reversed depending on the determined priority.

Specifically, if the priority of the TFC selection is higher, then the TFC selection and the E-TFC selection are performed as described above in Embodiment 5. If the priority of the E-TFC selection is higher, then a state of the mobile station when it uses each TFC is determined based on the remaining power as reference power, which is produced by subtracting the transmission power of an EUDCH using an E-TFC wherein the transmission power of the EUDCH is maximum from the maximum power of the mobile station.

According to the present invention, therefore, it is possible to assign the power of the mobile station with priority to a channel which provides a service with strict requirements against data delays, such as a distribution service for audio data and streaming, for example. Therefore, the quality of the service is increased.

The priority of the DPCH and the EUDCH may be determined by base station control device 101 and indicated to mobile stations 121, 123, or may be determined by mobile stations 121, 123.

What is claimed is:

1. A method of selecting a TFC (transport format combination) for transmitting a data of an enhanced uplink channel, comprising:
    calculating a first value related to a remaining power, by subtracting a second value related to a transmission power of a signal of DPCCH, from a third value related with a maximum UE (User Equipment) transmitter power; and
    determining that a TFC for the enhanced uplink channel can be used or not based on the first value.

2. The method according to claim 1, wherein the transmission power is currently measured.

3. The method according to claim 1, wherein the transmission power is measured during a period of one transmission time unit.

4. The method according to claim 1, further comprising:
    preventing from using the TFC for a transmission of the data of the enhanced uplink channel in a case where it is determined that the TFC cannot be used.

5. The method according to claim 4 further comprising:
    determining that a TFC for the enhanced uplink channel can be used, in a case where a fourth value is smaller than the first value, where the fourth value relates to a transmission power of the data of the enhanced uplink channel.

6. The method according to claim 1, further comprising:
    using the TFC for the transmission of the data of the enhanced uplink channel in a case where it is determined that the TFC can be used.

7. The method according to claim 1, wherein the enhanced uplink channel is used for transmitting a high-speed data.

8. A user equipment for selecting a TFC (transport format combination) for transmitting a data of an enhanced uplink channel, comprising:
    a processor comprising hardware configured to calculate a first value related to a remaining power, by subtracting a second value related to a transmission power of a signal of DPCCH, from a third value related with a maximum UE (User Equipment) transmitter power; and
    determining that a TFC for the enhanced uplink channel can be used or not based on the first value.

9. The user equipment according to claim 8, wherein the transmission power is currently measured.

10. The user equipment according to claim 8, wherein the transmission power is measured during a period of one transmission time unit.

11. The user equipment according to claim 8, wherein the processor comprising hardware is further configured to prevent from using the TFC for a transmission of the data of the enhanced uplink channel in a case where it is determined that the TFC cannot be used.

12. The user equipment according to claim 11, wherein the processor comprising hardware is further configured to determine that a TFC for the enhanced uplink channel can be used, in a case where a fourth value is smaller than the first value, where the fourth value relates to a transmission power of the data of the enhanced uplink channel.

13. The user equipment according to claim 8, wherein the processor comprising hardware is further configured to use the TFC for the transmission of the data of the enhanced uplink channel in a case where it is determined that the TFC can be used.

14. The user equipment according to claim 8, wherein the enhanced uplink channel is used for transmitting a high-speed data.

15. A base station comprising:
    a receiving unit configured to receive a data of an enhanced uplink channel using a TFC (transport format combination),
    wherein the TFC is determined, by a user equipment, for use in transmission of the data, based on a first value related to a remaining power,
    wherein the first value is calculated, by the user equipment, by subtracting a second value related to a transmission power of a signal of DPCCH, from a third value related with a maximum UE (User Equipment) transmitter power.

16. The base station according to claim 15, wherein the transmission power is currently measured.

17. The base station according to claim 15, wherein the transmission power is measured during a period of one transmission time unit.

18. The base station according to claim 15, further comprising:
    a transmitting unit configured to transmit a data indicating a set of TFCs, wherein the TFC is determined, by the user equipment, among the set of TFCs.

19. The method according to claim 1, wherein the signal currently transmitted is on the dedicated physical channel (DPCH).

20. The user equipment according to claim 8, wherein the signal currently transmitted is on the dedicated physical channel (DPCH).

21. The base station according to claim 15, wherein the signal currently transmitted is on the dedicated physical channel (DPCH).

* * * * *